United States Patent
Glover et al.

(10) Patent No.: US 8,857,379 B2
(45) Date of Patent: Oct. 14, 2014

(54) ROPE CONNECTING DEVICE AND METHOD

(75) Inventors: Chris Glover, Kennesburg, CO (US);
Grant Ritchey, Hudson, CO (US);
Craig A. Ritchey, Brighton, CO (US)

(73) Assignee: Ritchey Manufacturing, Inc., Brighton, CO (US)

( * ) Notice: Subject to any disclaimer, the term of this patent is extended or adjusted under 35 U.S.C. 154(b) by 137 days.

(21) Appl. No.: 13/341,595

(22) Filed: Dec. 30, 2011

(65) Prior Publication Data

US 2013/0171595 A1  Jul. 4, 2013

(51) Int. Cl.
*A01K 27/00* (2006.01)

(52) U.S. Cl.
USPC .......................................................... 119/805

(58) Field of Classification Search
USPC ............ 119/801–805; 24/131 R, 370, 129 R, 24/265 H, 910; 54/1, 34, 64, 71; 294/82.11, 82.14
See application file for complete search history.

(56) References Cited

U.S. PATENT DOCUMENTS

| | | | | |
|---|---|---|---|---|
| 684,255 A * | 10/1901 | Hughes | ............................ | 248/61 |
| 1,141,145 A * | 6/1915 | Rickerd | ........................ | 5/259.1 |
| 1,389,833 A * | 9/1921 | Kent | ............................ | 24/129 R |
| 1,591,105 A * | 7/1926 | Rolland | ........................ | 280/480 |
| 1,993,010 A * | 3/1935 | La Rue | ........................ | 119/805 |
| 2,518,179 A * | 8/1950 | Quinby et al. | ............... | 24/131 R |
| 2,947,456 A * | 8/1960 | Seron | ............................ | 224/258 |
| 3,055,332 A * | 9/1962 | Linsdeau | ...................... | 114/294 |
| 3,241,203 A * | 3/1966 | Quisling | ....................... | 24/714.8 |
| 3,438,098 A * | 4/1969 | Grabner | ....................... | 24/131 R |
| 3,707,022 A * | 12/1972 | Diehl | ............................ | 24/115 J |
| 3,718,947 A * | 3/1973 | Huber | ............................. | 24/298 |
| 3,910,226 A * | 10/1975 | McGahee | ....................... | 116/173 |
| 4,404,712 A * | 9/1983 | Northe et al. | ............... | 24/129 R |
| 4,811,475 A * | 3/1989 | Morton, Jr. | ..................... | 29/521 |
| 4,928,634 A * | 5/1990 | Voigt | ............................. | 119/805 |
| 5,116,009 A * | 5/1992 | Bayer | ............................ | 248/303 |
| 5,624,094 A * | 4/1997 | Protz, Jr. | .................. | 248/231.81 |
| 6,338,185 B1 * | 1/2002 | Solterbeck | .................. | 24/131 C |
| 7,739,775 B2 * | 6/2010 | Shimanski | ................... | 24/265 H |
| 7,882,600 B2 * | 2/2011 | Judd | ............................ | 24/115 R |
| 2004/0181918 A1 * | 9/2004 | Croteau | ........................... | 24/370 |
| 2008/0115335 A1 * | 5/2008 | McCay | ......................... | 24/131 R |
| 2008/0172843 A1 * | 7/2008 | Shimanski | ................... | 24/129 R |

OTHER PUBLICATIONS

"How to Tie a Honda Knot," CowboyWay, printed May 11, 2011, 3 pages, found at http://www.cowboyway.com/HowTo/TieAHonda2.htm.

(Continued)

*Primary Examiner* — Rob Swiatek
*Assistant Examiner* — Morgan T Barlow
(74) *Attorney, Agent, or Firm* — Sheridan Ross P.C.

(57) ABSTRACT

A rope connecting device has a breakaway feature enabling a user to practice roping and to retrieve the rope without having to walk to a lassoed object. The device includes a stem with a first hook formed at one end, and a second hook formed at the other end. The hooks each have a small gap separating respective free ends of the hooks from the stem. During use, a portion of the rope is passed through the first hook, and another portion of the rope is passed the through the second hook. With sufficient force applied to the rope, the rope breaks free from the device. in which one of the hooks opens allowing the rope to separate from the device, thereby releasing the rope from the lassoed object. The device can be reused by reattaching the portion of the rope to the hook that was released.

6 Claims, 6 Drawing Sheets

(56) References Cited

OTHER PUBLICATIONS

"How to Tie a Honda Knot in a Lasso or Lariat," CowboyWay, printed May 11, 2011, 3 pages, found at http://www.cowboyway.com/HowTo/TieAHonda.htm.

"How to Tie a Stopper Knot for a Honda," CowboyWay, printed May 11, 2011, 4 pages, found at http://www.cowboyway.com/HowTo/StopperKnot01.htm.

Root "The Most Useful Rope Knots for the Average Person to Know: Miscellaneous Knots," layhands.com, printed May 11, 2011, 18 pages, found at http://www.layhands.com/Knots/Knots_Miscellaneous.htm "Magic Loop Breakaway," NRSworld.com, printed May 11, 2011, 1 page, found at http://www.nrsworld.com/istar.asp?a=6&id=MAGICLOOP!MLEI.

"Pre-Made Breakaway Ropes—Practice Arena," Western Tack Rodeo Gear, printed May 11, 2011, 1 page, found at http://www.rodeohard.com/Pre-Made-Breakaway-Ropes—Practice-Arena_p_553.html.

\* cited by examiner

ROPE CONNECTING DEVICE AND METHOD

FIELD OF THE INVENTION

The present invention relates generally to devices and methods used for connecting ropes or cables, and more particularly to a rope connecting device and method that is especially adapted for use in rodeo events such as calf roping. The device is used as a releasable breakaway for a hooked end of a rope or lariat used during rodeo event training.

BACKGROUND OF THE INVENTION

Calf roping, also referred to tie down roping, is a well known rodeo event. A rider is mounted on a horse, and a calf is initially restrained within a chute. When the calf enters the chute, a light-weight piece of rope is secured around the calf's neck, and the other end of the rope is attached to a trip lever. The lever restrains a barrier cord/rope that extends across a larger adjacent pen or box where the horse and rider await. When the rider signifies he/she is ready, the calf is called, and a chute operator opens the chute door releasing the calf. When the calf runs from the chute, the calf reaches the end of the rope that trips the lever, the rope falls off the calf, and the barrier cord falls allowing the horse and rider to chase the calf. A timer clock is started once the barrier cord is released. The object of the event is for the rider to catch the calf by throwing a loop of rope from a lariat around the calf's neck. The rider then dismounts the horse, runs to the calf, and ties threes legs of the calf together. The rider must then throw up his/her hands signifying the tying is complete. At this instance, the timer clock is stopped and the time is recorded.

As one may appreciate, a rider increases skill by repetitive training in which the event is may be simulated by roping an object that may resemble the calf, or by practicing the event by roping a number of calves.

In order to increase the number of rope throw repetitions during practice, it is advantageous for the rider to be able to retrieve the rope without having to walk from the horse to the location where the calve or object was roped. Accordingly, rope breakaways have been developed which enable the rider to retrieve the rope. A rope breakaway operates such that when the force or tension on the rope exceeds the holding capacity of the breakaway device, the breakaway device releases the rope from around the animal. Typically, the continued movement of the calf or object that has been roped as compared to the rider's horse or rider that remain stationary provides the necessary tension to activate the release of the breakaway device.

Known prior art rope breakaways, also referred to as honda breakaways, may include a plastic or metallic device having an eye for receiving the end of the rope, and a loop having a small gap that allows a hooked end of the rope routed through the loop to break free through the gap when the rope experiences a sufficient amount of force.

While these breakaway devices may be adequate for their intended purpose, one distinct disadvantage of these types of breakaway devices is that the honda knot tied in the lariat for a roping competition is not actually incorporated on the practice rope, and the breakaway device is used to replace the honda knot. Thus, the breakaway device can change not only the weight of the rope, but also the "feel" of the rope when used during practice. These changes make practicing roping with the breakaway device less than optimum.

SUMMARY OF THE INVENTION

In accordance with the present invention, a rope connecting device and method are provided and especially adapted for use in rodeo events such as calf roping. Specifically, the device is used as a rope breakaway device enabling a user to practice roping and retrieving the rope without having to walk from the horse to remove the rope around the animal, and allowing the user to reconfigure the rope so it is ready for the next use in which a portion of the device remains attached to the rope.

According to the device of the present invention, it includes a stem or body with a partially closed hook formed at one end, and another partially closed hook formed at the other end. The partially closed hooks each terminate adjacent the stem, and a small gap exists between the ends of the partially closed hooks and the stem.

The device can be made of a plastic molded or extruded material in which the stem and the hooks have the same cross-sectional size and shape.

In a preferred embodiment, the device is substantially planar with one hook formed on one lateral side of stem, and the other hook formed on the opposite lateral side of the stem.

The openings defined by the hooks in a preferred embodiment are approximately the same size.

In one aspect of the invention, it may be considered a rope connecting device alone which facilitates use as a rope breakaway.

In another aspect of the invention, it includes the combination of the device along with the lariat/rope, and the particular configuration of the rope when the device is connected thereto. With respect to the configuration of the lariat, a simulated honda knot is tied on the rope. A honda knot incorporates a honda hook or bite that receives an end of the lariat in order to form the large lariat loop that is thrown by the user during competition to secure the calf. The honda hook typically includes a resilient sleeve that makes contact with the portion of the lariat routed through the honda loop. The sleeve reduces friction between the portions of the lariat in contact to prevent fraying of the lariat.

In the present invention, the honda knot may be simulated by a simple overhand knot. The honda loop is simulated by the free end of the rope that extends beyond the simulated honda knot. A first hook of the device is secured over this free end of the rope, and the second hook is secured over the portion of the rope near the overhand knot. The free end of the rope passing through the first hook may include a stopper knot or a stop formed by enlarging the end of the rope to prevent the end of the rope from inadvertently being pulled back through the adjacent hook.

During use, the user throws the rope to lasso the animal. As the animal becomes separated a greater distance from the stationary user or user's horse, the tension in the rope increases to a degree such that the tension force on the rope overcomes the material strength of the device thereby causing the hooks to deform, and one of the hooks opens enough so that the rope is forced through the enlarged gap located between the end of the hook and stem. When this occurs, the large lariat loop is opened allowing the rope to fall off of the animal or object being roped.

According to the method of the invention, the device is provided and is installed on the rope configuration simulating the honda knot and honda loop. The user throws the rope and lassos an object, such as a moving animal. The rope may be tied off to the user's horse or if the user is not on a horse, some other object near the user. When the user's horse stops or if the user ties off the rope on some other object, the continued separation of the animal and the horse/object results in a sufficient force applied to the rope causing separation of the device from the rope by opening of one of the partially closed hooks. The device can be re-installed on the rope by forcing open the hook that was un-hooked and passing the rope back through the enlarged gap. The flexible/elastomeric material properties of the device cause the partially closed hook to return to its normal position thereby securing the rope.

Additional features and advantages of the invention will become apparent from a review of the following drawings taken along with the detailed description.

DETAILED DESCRIPTION

Figures 1, 2A, 2B, 3:
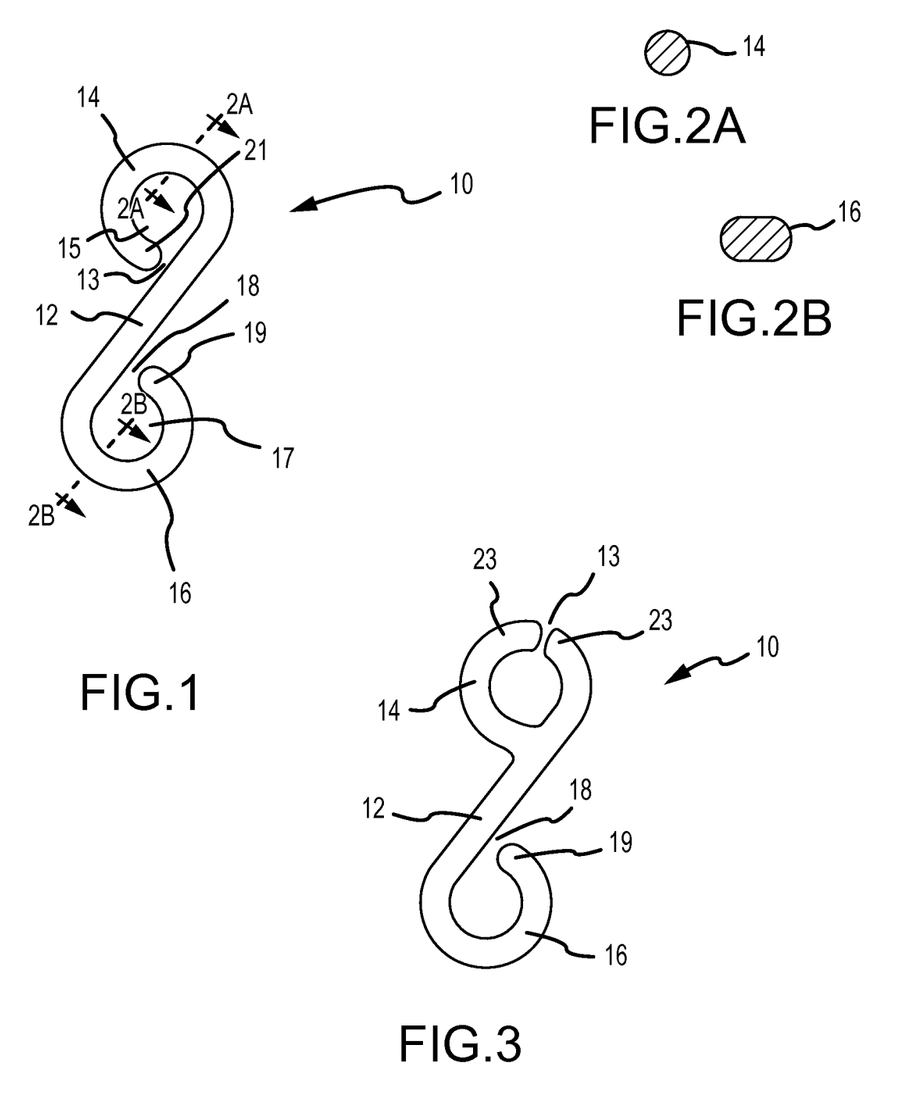
FIG. 1 is a plan view of the device of the invention in a first preferred embodiment.
FIG. 2A is a cross-sectional view of a portion of the device taken along line 2A-2A of FIG. 1.
FIG. 2B is a cross-sectional view of a portion of the device taken along line 2B-2B of FIG. 1.
FIG. 3 is a plan view of the device in a second preferred embodiment.

Referring to FIG. 1, the rope connecting/breakaway device 10 is illustrated in a first preferred embodiment. The device 10 includes a stem 12 having a straight or linear shape, a first partially closed hook 14 formed at one end of the stem and a second partially closed hook 16 formed at the other end of the stem 12. Each of the hooks 14 and 16 has respective eyes or openings 15 and 17. A small gap 18 exists between the stem 12 and an end 19 of the first partially closed hook 16. Similarly, a small gap 13 exits between the stem 12 and the end 21 of the second partially closed hook 14. As shown, the hooks 14 and 16 can be approximately the same size. The device can be configured substantially planar or flat, wherein one hook resides on one lateral side of the stem 12, while the other hook resides on the opposite lateral side of the stem 12. Although the gaps 13 and 18 are shown in particular positions, such as adjacent the stem 12, the gaps 13 and 18 can be located along other areas of the hooks 14 and 16 to best allow the device to hold at one hook and to break away at the other hook when a force is applied by the rope.

Referring to FIGS. 2A and 2B, cross sectional views are shown for portions of the device as taken along lines 2A-2A, and 2B-2B, respectively. More specifically, FIG. 2A shows a circular shaped cross section, while FIG. 2B shows a larger oblong or oval shaped cross section. Providing the device with one hook of a larger and therefore stronger configuration is one way to provide the functionality of the invention wherein one hook remains attached to the rope, while the other hook opens and breaks away from the rope. Thus, with the configuration shown in FIGS. 2A and 2B, the hook 14 would break away while the hook 16 would remain attached to the rope.

Referring to FIG. 3, another embodiment of the device 10 is shown in which the gap 13 is located at a different position as compared to the FIG. 1 embodiment. As shown, the gap 13 is located near the top of the device as the device is oriented in the FIG. 3. Accordingly, there are two free ends 23 of the hook 14 that are closely spaced from another forming the gap 13. It shall be understood that the gaps 13 and 18 can be provided at any selected locations along the hooks 14 and 16 to best provide break away capability or holding of the device onto a particular rope configuration.

Yet another embodiment of the device (not shown) is for one of the hooks 14 or 16 to be connected to the stem 12, while the other hook has a gap. In this embodiment, the selected closed hook remains with the rope, and the hook with the gap disconnects from the rope under sufficient applied force by the rope.

Figure 4:
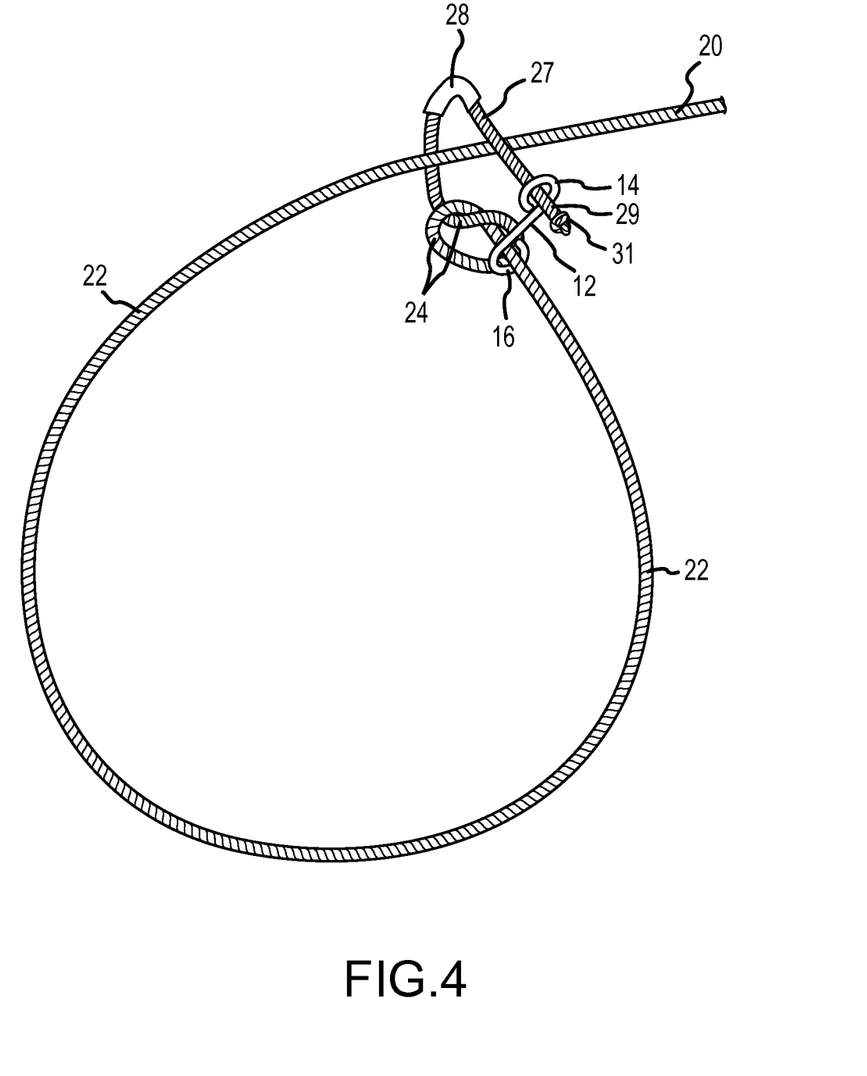
FIG. 4 is a perspective view of the device installed on a rope configuration in another embodiment of the invention.
Figure 5:
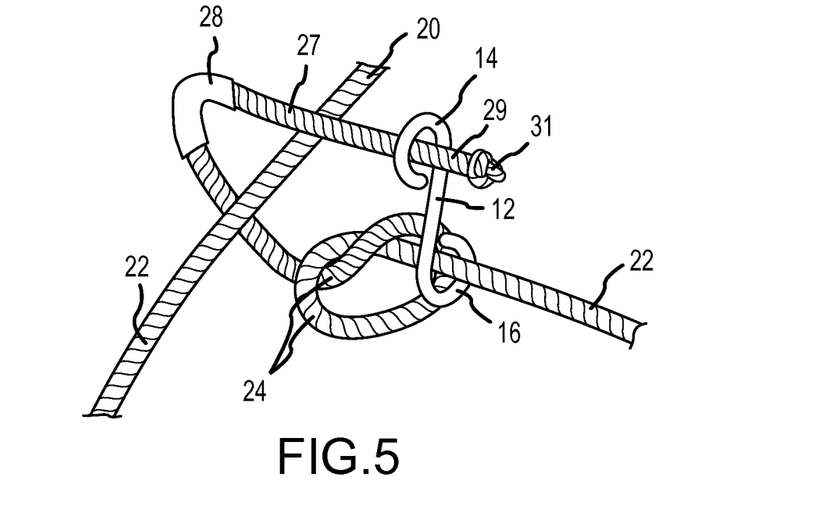
FIG. 5 is an enlarged view of the portion of the rope that receives the device in order to better view structural details of a rope configuration and device when installed.

Referring to FIGS. 4 and 5, the device is shown installed on a particular rope configuration. The rope includes a user end 20 that is held by the user during the roping practice. The other end of the rope includes a large loop 22 that is swung over the user's head and then thrown by the user over the targeted object. An overhand knot 24 is tied in the rope simulating the honda knot, leaving a short extension of the rope 27 remaining as the working end 29 of the rope. The extension 27 is routed under and back over the rope leaving the end 29 adjacent the knot 24 as shown thereby simulating the honda loop. A friction sleeve 28 is sewn to a portion of the extension 27 in order to mitigate friction between the portions of the rope in contact when the large lariat loop tightens over the object roped during use. A stopper knot or a fused portion 31 is formed on the working end 29 to prevent the working end 29 of the rope from being pulled back through the hook 14.

Figure 6:
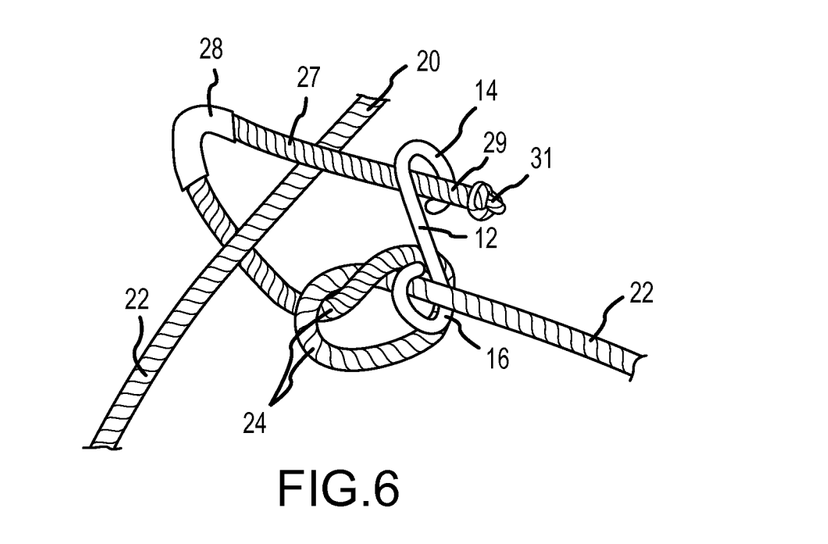
FIG. 6 is another enlarged view similar to FIG. 5, but showing the device rotated 180 degrees as it is attached to the rope.

FIG. 6 shows the device attached to the rope in a reverse manner as compared to the FIGS. 4 and 5. That is, FIG. 6 shows the device 10 rotated 180 degrees. It will therefore be appreciated that a user may attach the device to the rope in either manner, both being satisfactory for achieving the purpose of the device.

Figure 7:
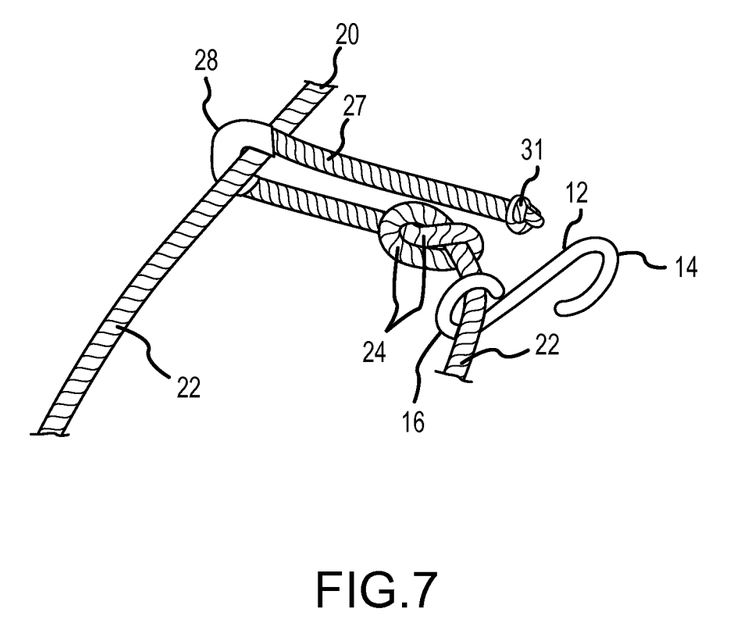
FIG. 7 illustrates the device and the rope being released from the device during use.

Referring to FIG. 7, this depicts the rope when the user has lassoed an object and the user has cinched the rope tightly around the object. As greater force is applied to the rope, such as due to the increased separation of the animal and the user's horse, tension is placed on the extension 27, and the knot 31 in turn places force against the first hook 14 causing it to open. The large loop of rope 22 also applies tension to the second closed hook 16, however assuming the hook 16 is stronger than the first hook 14, the second hook will remain attached while the first hook will break away first from the rope. Thus, when the tension forces overcome the material strength of the device, the weaker hook will deform to a degree allowing the rope to be freed. FIG. 7 shows the hook 14 separated from rope. Thus, the rope falls off the object and the rope can be retrieved.

The device is preferably made from a plastic material with sufficient rigidity which holds the sections of rope together when the user is manipulating the rope during practice, but is also flexible enough so that the hooks 14 and 16 can be widened in order for the rope to pass through once sufficient tension force is applied to the rope by the user.

There are a number of advantages to the particular device as well as combination with the rope configuration. For the device, it is a structurally simple device, yet is easily installed on a rope. The rope does not have to be structurally modified in order to accept the device. Further, use of the device allows for a close simulation of a honda knot and honda loop on the rope itself. This close simulation provides the user with the same "feel" when manipulating the rope. As mentioned with respect to existing breakaway devices, since no honda knot and honda loop are used, the breakaway device can add an abnormal weight to the rope, and can otherwise change the feel of the rope as it is manipulated by the user during practice.

According to the method of the invention, the device is installed on a rope configuration including use of a knot such as an overhand knot. The two hooks of the device are received in sections of the rope to include one hook secured to a portion of the rope directly adjacent the overhand knot, and the free working end of the rope received through the other hook. After the device is installed, the user manipulates the rope, such as a traditional swinging action of the rope over the user's head, and the large rope loop is thrown over the targeted object, such as a moving calve or other object such as a training dummy. The increased distance of separation between the user and the animal lassoed causes tightening of the rope. The forces applied to the rope eventually overcome the strength of the material in the device, enabling the rope to pass through the widened gap between a stem and one of the hooks of the device.

For the next use of the device, the rope is retrieved, the large loop is formed in the rope, the rope extension 27 is wrapped around the rope, and the hook that became unhooked is reattached to the rope.

Figure 8:
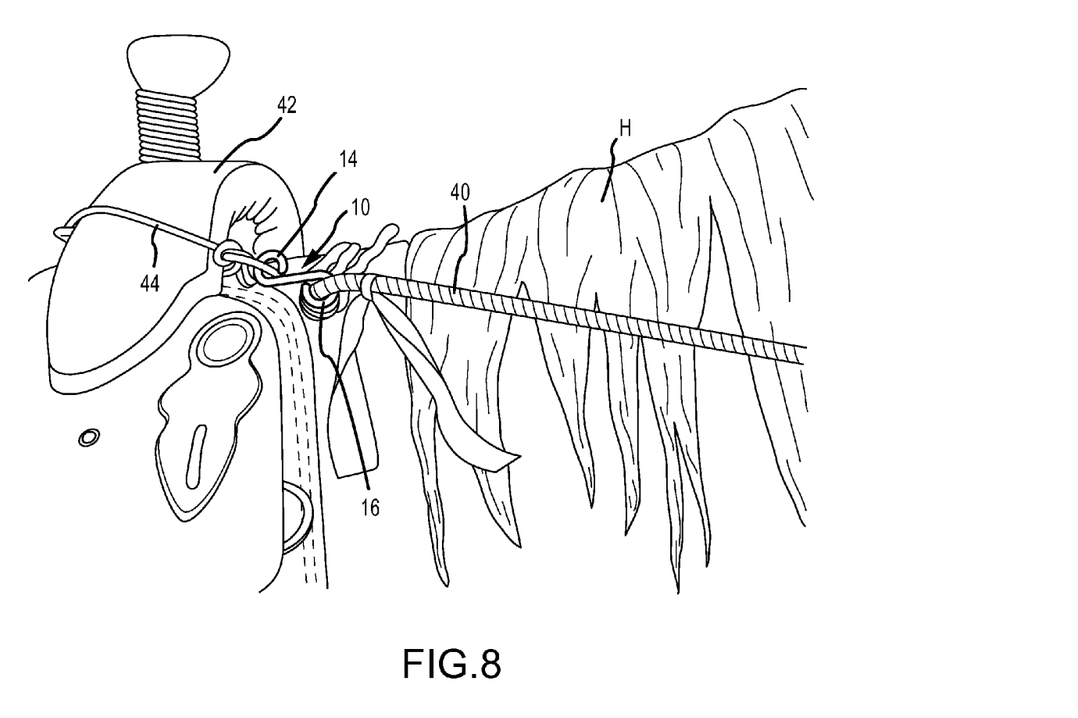
FIG. 8 illustrates another potential use of the device in securing a rope to a saddle.

Referring to FIG. 8, yet another use of the device 10 is shown with respect to a length of rope 40 that can be attached to a saddle 42 mounted on a horse H. As shown, the device 10 is configured so that the one hook 14 receives a cord or rope section 44 that is secured to a portion of the saddle 42. The other hook 16 is then mounted over the rope 40. The rope 40 is secured to the saddle 42, but can be separated from the saddle by sufficient force applied to the rope 40 thereby overcoming the material strength of the hooks 14/16.

Figure 9:
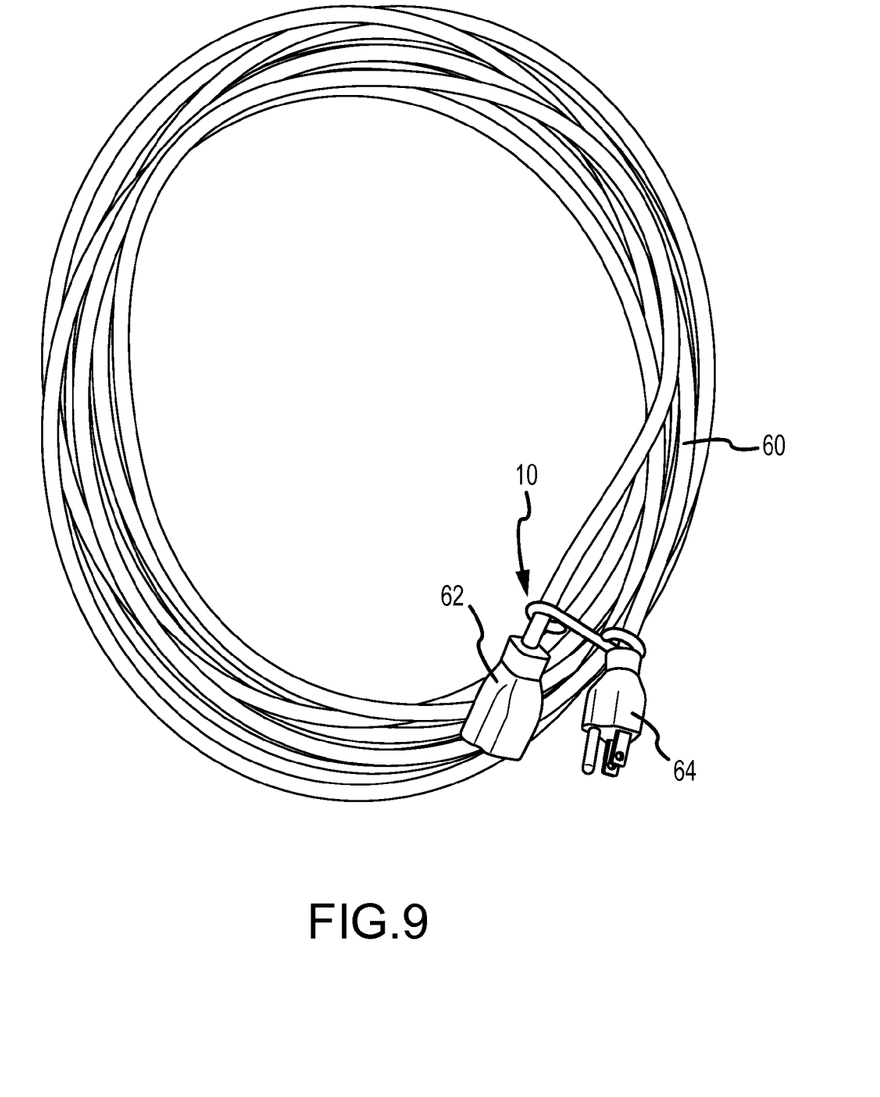
FIG. 9 illustrates yet another use of the invention, such as securing ends of an electrical cord.

FIG. 9 illustrates yet another example of use for the device, illustrating particularly the device 10 as it can be used to secure two ends of an electrical cord 60. As shown, one hook can be secured adjacent the female end 62 of the electrical cord, while the other hook may be secured adjacent to the male end 64 of the electrical cord. The device 10 can be attached, separated, and reattached as necessary to secure lengths of the cord.

Those skilled in the art can appreciate other uses of the device in which the simple yet reliable construction of the device enables rope or cord type material to be easily connected and disconnected.

While the present invention has been described with respect to preferred embodiments including devices and methods, it shall be appreciated that various changes and modifications to the invention can be made in accordance with scope of the claims appended hereto.

What is claimed is:

1. In combination, a rope connection device and rope, especially adapted for use as a practice lariat in rodeo events, said combination comprising:
   (i) a rope connecting device including a stem, a first hook formed at one end of the stem, a second hook formed at an opposite end of the stem, said first and second hooks each having a respective opening and a respective gap defined as a space between an end of the corresponding hook and an abutting surface of the stem;
   (ii) a length of rope including a first end of the rope held by a user, a second end of the rope including a large loop of the rope and a knot formed adjacent the second end of the rope, the second end of the rope further having a short extension wrapped around the rope and routed back towards said knot thereby forming a second smaller loop;
   wherein said device is connected to the rope such that one of the hooks receives a portion of the rope at the large loop adjacent the knot, and the other hook receives the short extension of the rope adjacent the second end of the rope, the second end of the rope including a stop formed thereon to prevent the second end of the rope from being pulled through the other hook; and
   wherein said rope connecting device separates said large loop of the rope from said short extension of the rope.

2. The combination as claimed in claim 1, wherein: said hooks are approximately the same size and shape.

3. The combination as claimed in claim 1, wherein: one hook is formed on one lateral side of the stem while the other hook is formed on an opposite lateral side of the stem.

4. The combination, as claimed in claim 1, wherein: one hook is secured to the portion of the rope at the large loop adjacent the knot, and the second hook receives the short extension of the rope.

5. The combination, as claimed in claim 1, wherein: said knot is spaced from said rope connecting device and said knot forms part of said second smaller loop.

6. The combination, as claimed in claim 1, wherein:
   (i) the first hook has a first cross-sectional shape, and the second hook has a second different cross-sectional shape; or (ii) the first hook has a first cross-sectional size, and the second hook has a second smaller cross-sectional size; and
   wherein one hook of said first and second hooks has a stronger configuration by having a larger cross-sectional shape or having a larger cross sectional size to facilitate the one hook remaining connected to the rope, while the other hook of said first and second hooks opens and breaks away from the rope under adequate force applied to the rope.

* * * * *